Jan. 17, 1956
F. S. TOWNEND
2,731,413
ION-EXCHANGE TREATMENT OF GASWORKS EFFLUENT
Filed Aug. 21, 1953
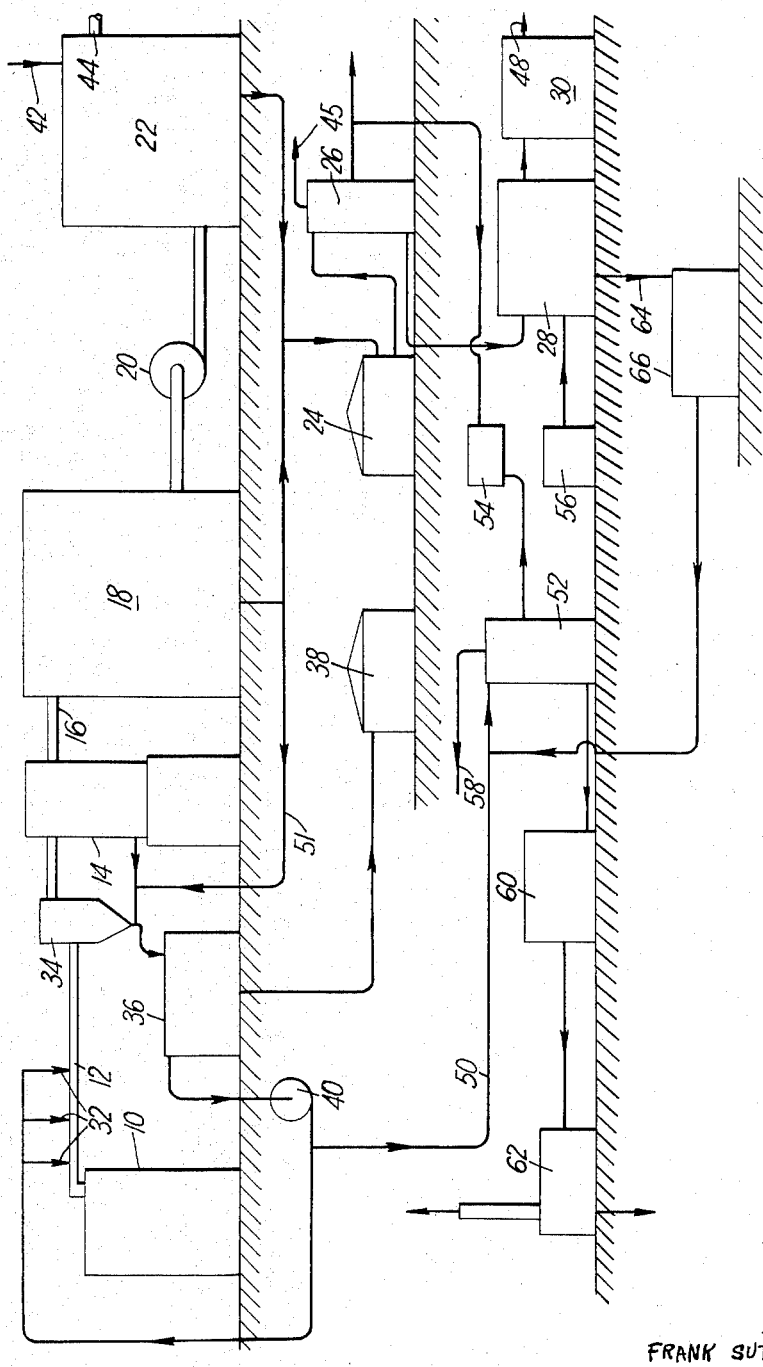
Inventor
FRANK SUTCLIFFE TOWNEND
By
Bailey, Stephens & Huettig
Attorneys

# 2,731,413

ION-EXCHANGE TREATMENT OF GASWORKS EFFLUENT

Frank Sutcliffe Townend, London, England, assignor to The Permutit Company Limited, London, England, Stewarts & Lloyds Limited, Glasgow, Scotland, and Woodall-Duckham Construction Company Limited, London, England Application August 21, 1953, Serial No. 375,772

Claims priority, application Great Britain August 26, 1952

4 Claims. (Cl. 210—24)

In the production of gas by heating coal in continuous vertical retorts, coke ovens and the like the gas leaves the carbonising chamber at temperatures between, say, 250 and 600° C. It is accompanied by quantities of steam, tar vapours and ammonia together with so-called impurities such as hydrogen sulphide, hydrocyanic acid, hydrogen chloride (fixed as ammonium chloride) and so on. It is usual for the hot mixture of gases and vapours to pass through a system of pipes to a gas cooler where its temperature is reduced substantially to atmospheric temperature.

In a typical plant the gases from the carbonising chamber flow to a gas cooler where ammoniacal liquor and tar separate from the gas as a result of condensation. These mixed liquids flow to a tar separator from which the tar is taken to storage. Some or all of the ammoniacal liquor is sprayed into the pipe system between the carbonising chamber and the gas cooler. This sprayed liquor partially cools the gases before they reach the gas cooler proper. The liquor sprayed into the pipe system is drained off by an apparatus interposed between the carbonising chamber and the gas cooler, and is returned to the sprays. In order to prevent build-up of liquor in the system serving the sprays a fraction is continuously bled off. As the gases condense in the gas cooler they dissolve the ammonium chloride and a proportion of the ammonia, hydrogen sulphide and other impurties carried into the cooler, and accordingly the sprayed liquor contains these impurities.

The cooled gas from the outlet of the gas cooler is passed by means of a fan or blower through an apparatus for removal of the remaining ammonia. In the case of the so-called indirect system of ammonia recovery this apparatus is an ammonia washer in which the ammonia is absorbed in fresh water. At the same time a further proportion of hydrogen sulphide, hydrocyanic acid and other impurities is removed from the gas by the water, which flows from the ammonia washer as an ammoniacal liquor which together with the fraction of the liquor bled off from the system serving the sprays and the fraction, if any, of the liquor produced in the gas cooler but not used in the spraying system, constitutes the liquor which must be purified before discharge. The cleaned gas passes from the ammonia washer to a gas holder.

In the so-called semi-direct process of ammonia recovery the ammonia is absorbed in sulphuric acid instead of water.

There are variations in the process, but whatever the nature of these there is always an ammoniacal liquor which must be purified before discharge. The salts present in the ammoniacal liquor are partly volatile salts (carbonate, sulphide and cyanide) and partly fixed salts (chloride, thiocyanate and thiosulphate), the two latter being produced, in general, by reaction of ammonia, hydrogen sulphide and hydrogen cyanide in the presence of oxygen. The ammoniacal liquor is commonly distilled in order to recover the ammonia, and the carbon dioxide, hydrogen sulphide and hydrocyanic acid are also removed from the liquor. The waste liquor flowing from the ammonia still, however, yet contains chloride, noxious inorganic substances such as thiocyanate and thiosulphate and also organic substances, such as phenols and other tar acids present as a result of contact between the liquor and the tar prior to their separation, which render it unfit for discharge into water courses and difficult to treat in sewage treatment plants.

One way of treating this effluent from the ammonia still is to remove the anions of these noxious inorganic substances, in particular those of the thiosulphates and thiocyanates, by ion-exchange, and thereafter to remove the organic compounds by adsorption on active carbon or otherwise. However, these noxious anions must still be destroyed. They are removed from the anion-exchange material as a relatively concentrated solution during the regeneration of the material, which may be effected solely by means of ammonia if the anion-exchange material process cycle are as described in the copending applications Serial No. 217,681 of Bott and Spiers, now Patent No. 2,687,999, and Serial No. 217,682 of Kressman and Spiers, now Patent No. 2,688,000, or by the successive use of ammonia and an acid if the process cycle is as described in British specification No. 592,767. In either case ammonia (as ammonium hydroxide) is required in the regeneration and a concentrated effluent containing the noxious anions is obtained. This effluent can be further concentrated, and the concentrate burnt.

When ion-exchange is used to obtain a concentrate of the noxious substances all the liquor containing these noxious substances is passed through the ion-exchange apparatus, and this leads to an uneconomic operation of the ion-exchange plant.

Our object is to lighten the load on the ion-exchange material and so to prolong its life between regenerations and render the whole operation cheaper.

We attain this object by preventing some of the noxious substances from entering the ion-exchange plant and yet concentrating them in a single final concentrate with those removed from the liquor by the ion-exchange plant. We do this by sending that proportion of the flushing liquor which is continuously withdrawn to a secondary ammonia still without passage through ion-exchange material. The bulk of the ammoniacal liquor is passed through the anion-exchange material, and the effluent produced in the regenerating stage and containing the anions of the noxious substances is sent to the same secondary ammonia still. Ammonia produced in this still may be used with advantage for regenerating the anion-exchange material. By means of the invention the main ammoniacal liquor has a reduced content of impurities particularly of chlorides, so the load on the ion-exchange material is reduced and more liquor can be passed through the ion-exchange material before regeneration is required. In addition, the effluent passing from the ion-exchange apparatus to be treated by activated carbon or otherwise for the removal of organic impurities contains a much reduced proportion of the organic materials other than monohydric phenols and this leads to improved purity of the monohydric phenols and longer life for the activated carbon. Of course, all the noxious impurities thus prevented from entering the ion-exchange apparatus must still be disposed of, but the total volume of liquor passed to the secondary still is not substantially different from that which must be dealt with when all the noxious substances go through the ion-exchange apparatus. Moreover, although theoretically all the ammonia required for the regeneration can be recovered from the effluent discharged from the ion-exchange apparatus during the regeneration, in practice there are always losses and these can very conveniently be made up by the ammonia distilled off in the primary still.

The accompanying drawing shows the preferred plant working according to the invention. In this drawing, which is a flow sheet, a carbonising chamber in the form of a continuous vertical retort is shown at 10 and is connected by a pipe 12 to an electrostatic tar-extractor 14, the gas flowing on through a pipe 16 to a cooler 18. From the cooler 18 the gases are passed by a fan or blower 20 to an ammonia washer 22, water being supplied to the washer through a pipe 42. The cleaned gas passes to a gas holder through a pipe 44, and the ammoniacal liquor to a tank 24. From the tank 24 this liquor is taken to an ammonia still 26, the ammonia, together with carbon dioxide, hydrogen sulphide and hydrocyanic acid, being taken away through a pipe 45. The effluent from the still 26 is taken through a vessel 28 containing anion-exchange material. Here the anions of the noxious inorganic salts are taken out of the liquor in exchange for hydroxyl ions. The organic compounds are still present in the effluent liquor from the vessel 28, and they are removed by adsorption on active carbon in a vessel 30. The liquor leaves the vessel 30 through a pipe 48 and is fit for disposal.

Reverting now to the initial stage of the plant the tarry vapours are removed in the extractor 14 together with a small quantity of aqueous drainings, the mixture flowing to a tank 36. In this tank the mixture separates into a tar fraction which is collected in a tank 38 and a liquor fraction which is pumped by a pump 40 to the sprays 32 in the pipe 12. The tank 36 also receives, from a drainage apparatus 34, the liquor which has been sprayed into the pipe 12. The liquor collecting in the tank 36 is the flushing liquor and it is retained in a separate circulation system serving the sprays 32 in the pipe system and is not allowed to mix with the main bulk of the ammoniacal liquor, which flows from the gas cooler 18 and the ammonia washer 22. If insufficient liquor is drained from the tar-extractor to supply the spraying system additional liquor may be taken from the gas cooler 18 through a pipe 51. The flushing liquor continues to be circulated through the sprays 32 with continuous addition to it of the aqueous drainings from the tar-extractor 14 until the concentration of fixed salts, notably chloride, reaches a predetermined maximum. A small amount is then continuously bled off through a pipe 50 and distilled with lime in a secondary ammonia still 52. This small amount of continuously circulating flushing liquor which is withdrawn need not be greater than 5 to 10% of the total ammoniacal liquor produced in the plant. It contains the bulk of the organic substances other than the monohydric phenols and a considerable proportion of the fixed inorganic salts which would otherwise appear in the ammoniacal liquor from the gas cooler and ammonia washer.

The top of the still 52 is cooled to a temperature of about 40° C. to allow hydrogen sulphide, carbon dioxide and HCN vapour to pass off through a pipe 58 without any of the ammonia. The ammonia formed is condensed in a condenser 54 and collected in a tank 56. The liquid effluent from the still 52 is passed to a concentrator 60 where it is reduced to 10% of its original bulk. The effluent is then burnt in an incinerator 62.

When the anion-exchange material in the bed 28 is exhausted it is regenerated by concentrated ammonia solution from the tank 56. The effluent regenerant leaves the vessel 28 through a pipe 64 and is passed via a buffer tank 66 to the ammonia still 52. Thus the concentrated ammonia liquor takes up the thiocyanate and thiosulphate ions which have been removed from the main bulk of the ammoniacal liquor, and is delivered from the ion-exchange apparatus to the tank 66, from which it is continuously withdrawn to enter the secondary still 52.

If the amount of ammonia recovered from the still 52 is not enough for the regeneration of the anion-exchange material, some of the ammonia distilled from the still 26 may be taken to the condenser 54 to make up the required amount.

If the carbonising chamber is a coke oven, it is usual to eliminate the tar-extractor and to take from the gas cooler 18 all the ammoniacal liquor required to supply the flushing circuit.

I claim:

1. In a method of concentrating the noxious inorganic substances present in gas produced by carbonisation, removing an ammoniacal liquor from said gas, distilling a fraction of said liquor in a primary ammonia still, subjecting the liquid effluent from said distillation to anion-exchange to remove noxious substances therefrom on anion-exchange material, periodically regenerating said anion-exchange material, distilling the effluent regenerant in a secondary still, flushing said gas as it leaves the carbonising plant with a continuously circulating fraction of said ammoniacal liquor, continuously withdrawing a fraction of said continuously circulating ammoniacal liquor containing some of the noxious substances, distilling said withdrawn fraction in said secondary still, and collecting the effluent from said secondary ammonia still containing substantially all the noxious inorganic substances in concentrated form.

2. In a method according to claim 1 the additional step of regenerating said anion-exchange material with the ammonia produced in said secondary ammonia still.

3. In a method according to claim 1 the additional step of regenerating said anion-exchange material with the ammonia produced in said secondary ammonia still and some at least of the ammonia produced in said primary ammonia still.

4. In a method of concentrating the noxious inorganic substances present in gas produced by carbonisation in a continuous vertical retort, passing the hot mixture of gases through a tar-extractor of the electrostatic type, removing an ammoniacal liquor from said gas, distilling a fraction of said liquor in a primary ammonia still, subjecting the liquid effluent from said distillation to anion-exchange to remove noxious substances therefrom on anion-exchange material, periodically regenerating said anion-exchange material, distilling the effluent regenerant in a secondary still, flushing said gas as it leaves the carbonising plant with a continuously circulating fraction of said ammoniacal liquor, continuously withdrawing a fraction of said continuously circulating ammoniacal liquor containing some of the noxious substances, distilling said withdrawn fraction in said secondary still, and collecting the effluent from said secondary ammonia still containing substantially all the noxious inorganic substances in concentrated form.

References Cited in the file of this patent

UNITED STATES PATENTS

| | | |
|---|---|---|
| 2,227,520 | Tiger | Jan. 7, 1941 |
| 2,360,195 | Brittin | Oct. 10, 1944 |
| 2,397,575 | Tiger | Apr. 2, 1946 |
| 2,585,652 | Hartough et al. | Feb. 12, 1952 |